(12) United States Patent
Hecht et al.

(10) Patent No.: US 6,182,901 B1
(45) Date of Patent: Feb. 6, 2001

(54) ORIENTATIONAL DISAMBIGUATION FOR SELF-CLOCKING GLYPH CODES

(75) Inventors: David L. Hecht, Palo Alto; L. Noah Flores, Soquel, both of CA (US)

(73) Assignee: Xerox Corporation, Stamford, CT (US)

(*) Notice: Under 35 U.S.C. 154(b), the term of this patent shall be extended for 1314 days.

(21) Appl. No.: 08/532,040

(22) Filed: Sep. 21, 1995

Related U.S. Application Data (63) Continuation of application No. 08/171,583, filed on Dec. 22, 1993.

(51) Int. Cl.[7] .................................................. G06K 19/06
(52) U.S. Cl. ........................................ 235/494; 235/487
(58) Field of Search ................................ 235/494, 487

(56) References Cited

U.S. PATENT DOCUMENTS

| | | | |
|---|---|---|---|
| 4,924,078 | * | 5/1990 | Sant'Anselmo ................ 235/494 |
| 5,091,966 | * | 2/1992 | Bloomberg ..................... 382/21 |
| 5,221,833 | * | 6/1993 | Hecht ............................. 235/494 |
| 5,459,307 | * | 10/1995 | Klotz, Jr. ........................ 235/454 |

* cited by examiner

Primary Examiner—Karl D. Frech (57) ABSTRACT

An optically readable record for storing encoded information comprises (1) a recording medium, (2) a self-clocking data code for encoding the information, with this data code being composed of glyphs that are written in a two dimensional code field on the recording medium on centers that are spatially distributed in nominal accordance with a predetermined spatial formatting rule. The glyphs are defined by respective symbols that are selected from a finite set of optically discriminable symbols to encode the information. Further, there is at least one additional glyph pattern that is written on the recording medium in nominal accordance with the aforementioned spatial formatting rule, with this additional code pattern being discriminable from the data code and being selected to disambiguate data codes that are rotated and/or reflected.

5 Claims, 9 Drawing Sheets

ORIENTATIONAL DISAMBIGUATION FOR SELF-CLOCKING GLYPH CODES

This is a continuation, of application U.S. Ser. No. 08/171,583, filed Dec. 22, 1993.

FIELD OF THE INVENTION

This invention relates to self-clocking glyph codes for recording digital information on graphic recording media, such as plain paper. Even more specifically, this invention pertains to techniques for increasing the tolerance of such glyph codes to geometric distortion and physical damage, while preserving their homogeneous visual appearance and enhancing their suitability for applications requiring random access to the information they encode.

CROSS REFERENCES TO RELATED APPLICATIONS

This application is related to commonly assigned, concurrently filed Hecht et al. United States patent applications on "Explicit Synchronization for Self-Clocking Glyph Codes" U.S. Pat. No. 5,449,895, issued Sep. 12, 1995, "Global Addressability for Self-Clocking Glyph Codes" U.S. Pat. No. 5,453,605, issued Sep. 26, 1995, "Framing Codes for Robust Synchronization and Addressing of Self-Clocking Glyph Codes" application U.S. Ser. No. 08/549,195 which is a continuation of application U.S. Ser. No. 08/172,443, and "Random Access Techniques for use with Self-Clocking Glyph Codes" U.S. Pat. No. 5,449,896, issued Sep. 12, 1995.

BACKGROUND OF THE INVENTION

Figure 1:
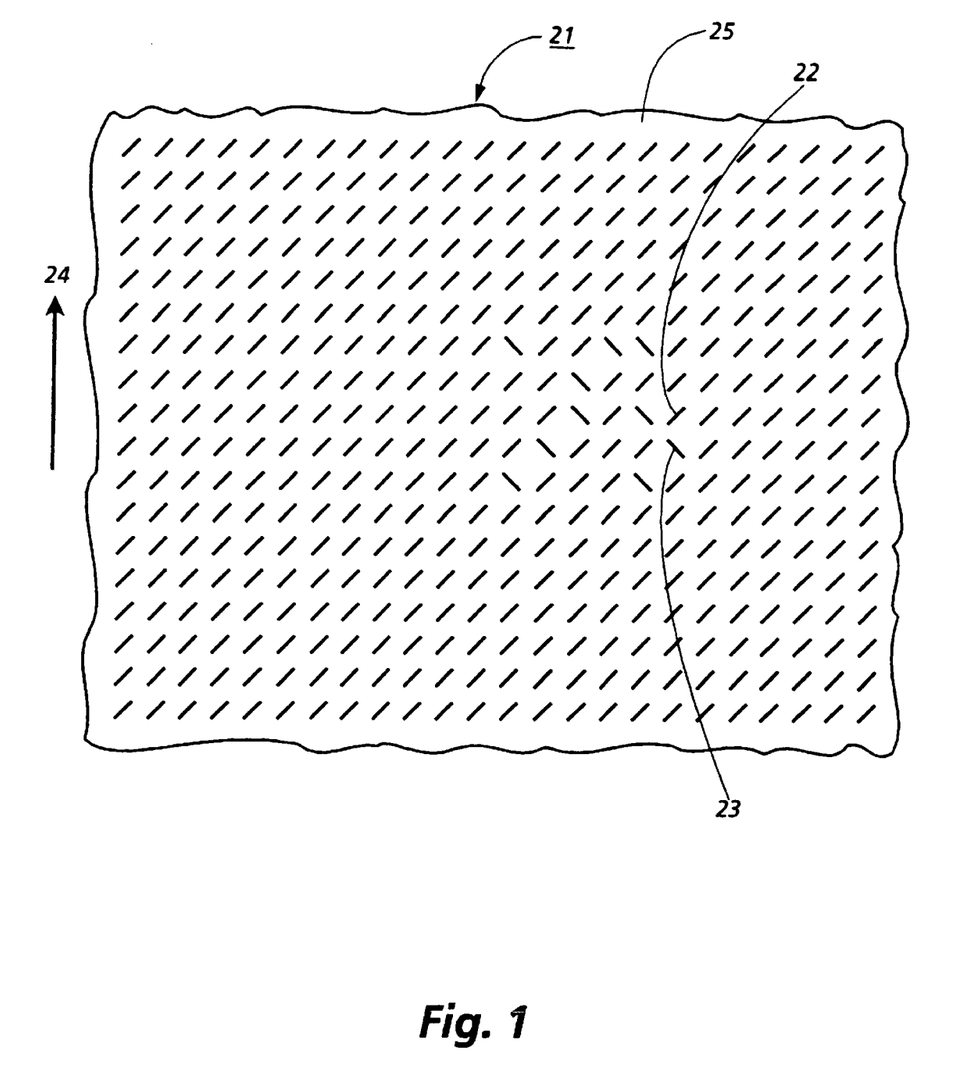
FIG. 1 is a simplified, enlarged illustration of a standard self-clocking glyph code that is written in accordance with a basic two dimensional block formatting rule.

In keeping with prior proposals, a basic self-clocking glyph code, such as shown in FIG. 1, typically is composed of an array 21 of elongated, slash-like symbols or "glyphs" 22 and 23 that are written with their longitudinal axes tilted at angles of approximately −45° and +45° with respect to the vertical axis 24 of a recording medium 25 to encode bit values of "1" and "0", respectively, or vice-versa, in each of the glyphs. These codes are "self-clocking" because they include an optically detectable symbol (a "glyph") for each of the values they encode. This means that the detection of the glyphs implicitly synchronizes the decoding process to the code once the decoding process has been properly spatially oriented with respect to the code. As will be evident, this implicit synchronization is valid so long as all of the glyphs are detected or otherwise accounted for in correct logical order. If, however, synchronization is lost, there is nothing to restore the implicit synchronization, so a loss of synchronization generally causes an implicitly synchronized decoding process to experience fatal error. For a more detailed discussion of these glyph codes and of techniques for decoding them, the following commonly assigned U.S. patent documents are hereby incorporated by reference: a copending application or Bloomberg et al. on "Self-Clocking Glyph Shape Codes," which was filed Aug. 18, 1992 under U.S. Ser. No. 07/931,554; Bloomberg U.S. Pat. No. 5,168,147 which issued Dec. 1, 1992 on "Binary Image Processing for Decoding Self-Clocking Glyph Shape Codes;" Bloomberg et al. U.S. Pat. No. 5,091,966, which issued Feb. 25, 1992 on "Adaptive Scaling for Decoding Spatially Periodic Self-Clocking Glyph Shape Codes;" and Stearns et al. U.S. Pat. No. 5,128,525, which issued Jul. 7, 1992 on "Convolution Filtering for Decoding Self-Clocking Glyph Shape Codes."

As will be seen, these prior proposals not only describe the use of two discriminable glyph shapes for the encoding of single bit binary values, but also teach that "glyph shape encoding" is extensible to the encoding of digital values of any given bit length, n, in each glyph by utilizing a code having $2^n$ discriminable glyph shapes (where the discriminability between glyphs representing different values is based upon the distinctive rotational orientations and/or the distinctive geometric configurations of the different glyphs). Furthermore, another copending and commonly assigned U.S. patent application of David L. Hecht on "Self-Clocking Glyph Code Having Composite Glyphs for Distributively Encoding Multi-bit Digital Values," which was filed Dec. 12, 1991 under U.S. Ser. No. 07/814,842 and which also is hereby incorporated by reference, provides a technique for encoding a plurality of bit values in each of the glyphs by constructing the glyphs so that they each have a plurality of independently modulatable and readily distinguishable (e.g., substantially orthogonal) characteristics. Thus, even though a straightforward self-clocking glyph code of the type shown in FIG. 1 is featured in this disclosure to simplify the description, it will be evident that the broader aspects of this invention are applicable to other glyph codes, including more complex ones.

In practice, each of the glyphs 22 and 23 usually is defined by writing a recognizable pattern of "on" and "off" pixels into a two dimensional, array of pixel positions (i. e., a "symbol cell"). As a general rule, the pixels that form the body of the glyph (say, the "on" pixels) are written into contiguous pixel positions that are more or less centered within the symbol cell, and the other or "off" pixels are written into the remaining pixel positions of the symbol cell to provide a contrasting surround that demarks the edges of the glyph and separates it from its neighbors.

The symbol cells, in turn, ordinarily are tiled onto the recording medium in accordance with a preselected spatial formatting rule, so the logical order of the data values that the glyphs encode is preserved by the spatial order in which the glyphs are mapped onto the recording medium. For example, the symbol cells may be written on the recording medium in accordance with a regular and repeating spatial formatting rule that is selected to map the glyph encodings into a two dimensional, rectangular array of logical data blocks of predetermined size, such as data blocks having a 16 symbol cell×16 symbol cell format. These data blocks suitably are organized on the recording medium in left-to-right, top-to-bottom logical order.

The size of the symbol cells that are used for the glyphs depends on a variety of factors, including the spatial resolution of the printing process that is employed to write the glyphs, the type and extent of the degeneration that the printed glyph code is required to tolerate, and the spatial resolution of the lowest resolution scanning process that is expected to be able to recover the code. In view of these constraints, a 300 s.p.i. printer suitably centers the glyphs in 5 pixel×5 pixel or 7 pixel×7 pixel symbol cells. Even larger symbol cells can be employed for the glyphs if the increased granularity of the textured appearance of the printed glyph code is tolerable or unavoidable. As a general rule, of course, the smallest practical symbol cell size is esthetically most pleasing because the visual texturing appearance of the glyph code gradually blends as the symbol cell size is reduced. Indeed, codes composed of smaller symbol cells tend to have generally uniform gray scale appearances when they are viewed under ordinary lighting at normal viewing distances.

The existing techniques for decoding self clocking glyph codes are designed to be initialized at or near the center of a reference glyph that occupies a known spatial position relative to the remainder of the glyph code (for example, the glyph in the upper, lefthand corner of a rectangular array of glyphs). Thus, accurately locating this reference glyph clearly is a key to spatially synchronizing such a decoding process with the glyph code.

While synchronous initialization of the decoding process is a necessary condition for orderly decoding of a self-clocking glyph code, it may not be a sufficient condition to ensure accurate decoding of the code because the scanned-in image of the glyph code pattern often is distorted by skew and/or scaling errors. For this reason, prior decoding processes generally have attempted to determine the relative spatial positions of three or more reference glyphs in recognizeable positions that have a known nominal, non-colinear relationship with respect to each other (such as the corner glyphs of a rectangular array of glyphs) with sufficient precision to compute skew and scaling correction factors. These correction factors then are used to adjust the angle and magnitude of a vector that dictates the direction and magnitude of the jumps the decoding process makes while it is advancing from glyph-to-glyph.

As will be appreciated, anything that prevents the decoding process from establishing and maintaining proper spatial synchronization with the glyph code threatens to defeat the decoding. Indeed, as a general rule, any glyphs that are isolated from synchronously readable glyphs may be unsynchronizable, especially in the interior of a glyph code pattern. Spatial synchronization is, of course, required to enable the decoding process to preserve the logical ordering of the data that is encoded in the glyphs. Minor synchronization errors affecting a limited number of glyphs may be tolerable if the code has sufficient error correcting capacity (i. e., error correction code protection) to correct for the resulting decode errors, but more extended synchronization errors generally result in incomplete reading of the encoded information. Ultimately, this performance degradation can become sufficiently severe to be unacceptable.

Accordingly, it will be evident that one of the more significant disadvantages of spatially synchronizing a glyph decoding process through the use of a global imaginal reference that is computed from the spatial locations of certain key glyphs, such as the corner glyphs of a rectangular glyph pattern, is that various factors may prevent the spatial location of one or more of those key glyphs from being determined with sufficient precision to compute a valid reference, thereby preventing the decoding process from achieving and/or maintaining spatial synchronism with the glyph code. Moreover, even when a valid global reference can be computed, there is an appreciable risk that the decoding process will lose synchronization. For example, the scanned-in image of the glyph code might be sufficiently degraded to cause the decoding process to erroneously branch from one row of glyphs to an adjacent row, or to skip over a glyph without accounting for it, or to miscount the number of unreadable glyphs in a damaged region of the image. Unfortunately, none of the known self-clocking glyph codes or related decoding processes enable the decoding process to re-establish proper synchronization once it has been lost, so a loss of synchronization usually causes these existing decoding processes to degenerate into an irreversible failure mode.

The problems that have been encountered with establishing and maintaining proper spatial synchronization during the decoding of self-clocking glyph codes have been compounded by the lack of reliable techniques for detecting asynchronous operation of the decoder. Glyph centers have been counted during the decoding of these codes on the theory that a miscount over any predefined segment of the formatted code will signal a loss of synchronization. This is a weak synchronization validation process if part of the glyph code pattern (e.g., a portion of its periphery) is missing or otherwise undetectable. there may be an ambiguity with respect to the number of glyphs that are present in the image and with respect to what part of the glyph pattern is present in the image. Thus, the decoding process may provide invalid results, without providing any warning that the results are invalid.

Image rotation of 90°, 180°, 270° and reflection result in rotational and mirror image transformations of the glyph code pattern, and these transformations can alter the apparent spatial order of the glyphs and/or the apparent rotational orientation of the individual glyphs. Indeed, this is an especially significant issue when the glyphs encode the data values in their rotational orientations, such as when the glyphs are slash-like symbols that are oriented at ±45° with respect to the longitudinal axis of the recording medium to encode high ("1") and low ("0") logic level bits, respectively, because such glyphs often are written in patterns that have rotational symmetry. Unfortunately, the orientation of scanned-in glyph code patterns frequently involves some ambiguity. For example, there typically is a four-fold rotational ambiguity in the case of a glyph code that is composed of a square array of slash-like glyphs of the above-described type that are written into square symbol cells, and a two-fold ambiguity in the case of a glyph code that is composed of a rectangular array of such glyphs.

Some of the commercially available two dimensional data codes, such as Vericode™ by Veritex and Datacode™ by Data Code International, have distinctive reference marks along one or more of their borders that can be used for scaling and for explicitly spatially synchronizing the decoding of those codes However, these reference marks are visually distinctive so they tend to increase the visual obtrusiveness of those codes. One of the principal advantages of self-clocking glyph codes is that they tend to be esthetically pleasing because of their non-obtrusive visual appearance, so it would be counterproductive to supplement them with reference patterns that have such a strong visual impact.

SUMMARY OF THE INVENTION

In accordance with the present invention, an optically readable record for storing encoded information comprises (1) a recording medium, (2) a self-clocking data code for encoding said information, with this data code being composed of glyphs that are written in a two dimensional code field on said recording medium on centers that are spatially distributed in nominal accordance with a predetermined spatial formatting rule, where the glyphs are defined by respective symbols that are selected from a finite set of optically discriminable symbols to encode said information, and (3) at least one additional glyph pattern that is written on said recording medium in nominal accordance with said spatial formatting rule, with this additional code pattern being discriminable from said data code and being selected to disambiguate data codes that are rotated and/or reflected.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the intent is to cover all modifications, alternatives and equivalents falling within the spirit and scope of the invention as defined by the appended claims.

Figure 2:
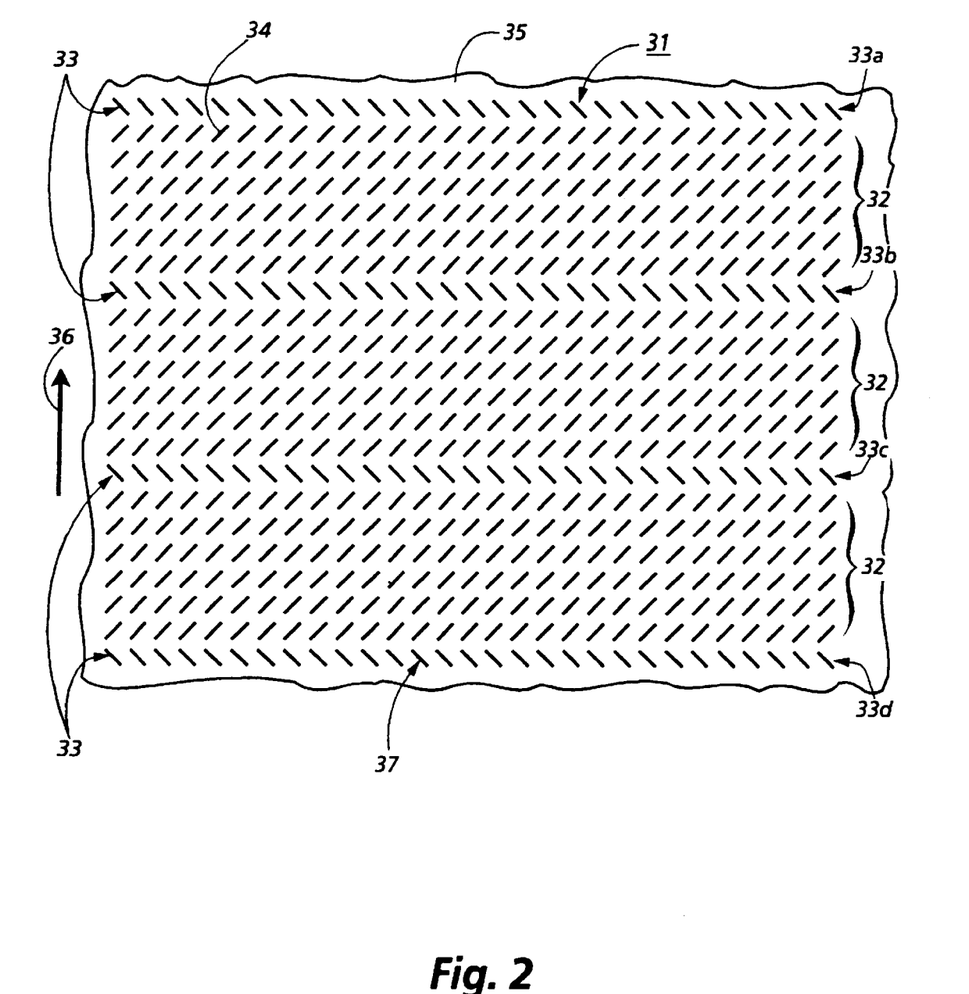
FIG. 2 is a simplified, enlarged illustration of a block formatted self-clocking glyph code that includes synchronization code patterns in accordance with this invention.

In accordance with this invention, as shown in FIG. 2, a self clocking glyph code 31 includes a data code 32, together with a two dimensional, distributed sync code pattern 33. For illustrative clarity, the data code 32 is shown as being composed of slash-like symbols or "glyphs" 34 that are tilted at −45° with respect to the longitudinal axis of the recording medium 35 (see the process direction arrow 36), while the sync code pattern 33 is shown as being composed of glyphs 37 that are tilted at +45° with respect to that axis. In practice, of course the angular orientation of the data glyphs 34 is modulated in accordance with the respective data values they encode. Further, the angular orientation of the sync code glyphs 37 might also be modulated in accordance with a cyclic or acyclic sequence of values, as more fully described hereinbelow. Consequently, there may not be any symbolic distinction between a given data glyph 34 and a given sync glyph 37. Indeed, in keeping with one of the more detailed features of this invention, the data glyphs 34 and the sync glyphs 37 preferably are potentially identical members of the same finite symbol set because this causes the sync code pattern 33 to visually blend with the data code 32 (see FIG. 8) effectively. Moreover, to even further enhance the visual homogeneity of the composite code 31, the sync code pattern 33 advantageously is selected to avoid visually distinctive glyph patterns, such as long runs of the same symbol.

More particularly, in keeping with this invention, the sync code encoded glyph pattern 33 (sometimes referred to herein as the "sync code pattern") is composed of a predefined, cyclical or acyclical pattern of glyphs that is sufficiently distinctive to be disambiguated from the data code 32 with acceptably high statistical reliability. This sync code pattern 33 is written on the recording medium 35 in accordance with the same spatial formatting rule as the data code 32, but the formatting of the sync code pattern 33 is further governed by at least one additional rule that establishes a predetermined localized geometric relationship between the spatial positioning of the glyphs 37 of the sync code pattern 33 and the spatial positioning of nearby data glyphs 34. The logical ordering of the sync code values that are encoded by the glyphs of the sync code pattern 33 is predetermined. Thus, the sync code pattern 33 defines localized spatial references for determining the logical ordering of the data glyphs 34.

As will be appreciated, the replicability of the sync code pattern 33 ensures that the spatial references it provides survive replication of the composite code 31 (such as when the composite code 31 is replicated by photocopying or facsimile transmission to provide a hardcopy replica or by bitmap input scanning to provide an electronic representation) subject only to the losses that might occur if the original image and/or the copy of their composite code 31 is damaged. Advantageously, the sync code pattern 33 is distributed throughout the composite code 31 and is selected so that the density of the spatial references it provides is sufficient to locally reference all of the data glyphs 34. In that event, any non-linear distortions the data code 32 might experience while being replicated are tracked by corresponding localized non-linear distortions of the sync code pattern 33.

In theory, the sync code pattern 33 may take many different forms. In practice, however, it advantageously is written as a linear pattern (or, for a nonlinear implementation, in areas of adjacent glyph cells) because these types of subpatterns are easier to identify than non-linear patterns of spatially scattered glyphs. For example, the sync code pattern 33 may be composed of linear subpatterns of glyphs 37 that are written on the same center-to-center spacing as the data glyphs 34 to span the spatially formatted glyph code 31 (or logical subsets thereof- see FIG. 4) in one direction (see FIG. 2) or in a plurality of different directions (see FIG. 3 et seq.).

Focusing on linear sync code glyph patterns (i.e., patterns of sync code encode glyphs that are written in linear spatial sequences), it will be understood that such a sync code pattern may be defined somewhat more generally by a two dimensional array of linear sync code subpatterns, where each of the subpatterns is composed of every mth glyph (where m is an integer) along a substantially straight line that runs parallel to a predetermined synchronization direction. The degenerative case, where m=1, provides fine grain explicit synchronization because the sync code pattern is composed of adjacent glyphs. On occasion, however, a coarser explicit synchronization may suffice because the implicit synchronization that is provided by the self-clocking properties of the data glyphs 34 is valid whenever the presence of the data glyphs is detectable reliably, regardless or whether the detected data glyphs can be accurately decoded or not. In any event, when linear sync code subpatterns of a given granularity, m, are employed, each set of glyphs that is (1) aligned in a synchronization direction and (2) composed of glyphs that are separated from each other by m−1 intermediate glyphs, implicitly includes either all sync glyphs in proper sequence or no sync glyphs, except where desynchronizing faults (i.e., synchronization errors) are encountered.

Sync code patterns composed of parallel, longitudinally separated, linear subpatterns, such as the pattern 33 in FIG. 2, are an interesting example of how the inclusion of a pattern of sync code encoded glyphs facilitates establishing and maintaining synchronization during the decoding of a self-clocking code 32. In this embodiment, the sync code subpatterns 33a–33d are written in parallel alignment with a major axes of the data code 32 (i.e., its lateral or x -axis in a standard orthogonal coordinate space), and these subpatterns 33a–33d are composed of sync code encoded glyphs 37 that are written on the same center-to-center spacing along the x-axis as the data glyphs 34. Further, the sync code subpatterns 33a–33d each is of sufficient length to span the data code 32 along its x-axis. And, these sync code subpatterns 33a–33d are spatially displaced from each other along the orthogonal axis of the composite code pattern 31 (i.e., its longitudinal axis or y-axis) by a predetermined constant number of lines of data code 32.

Given the x, y coordinates on which the glyphs 37 of any two neighboring sync code subpatterns (such as the subpatterns 33a and 33b) are centered, prospective center locations for the data glyphs 34 that reside therebetween can be identified by pairing the glyphs 37 that occupy logically corresponding positions in the two sync code subpatterns with each other and by then linearly interpolating between the x, y coordinates of these logically paired glyphs. This process provides strong explicit synchronization axially of the sync code subpatterns 33a–33d because it is sensitive to nonlinear distortion along that axis. Weaker synchronization is provided orthogonally to the subpatterns 33a–33d because orthogonal positioning is determined by interpolation from the spacing of the neighboring sync code subpatterns 33a–33d.

Fortunately, the implicit synchronization that is provided by the self-clocking property of the data glyphs 34 often is sufficient for maintaining the synchronization of the decode process while the data glyphs 34 that are disposed between the parallel sync code subpatterns 33a–33d are being read. For example, the data glyphs 34 that are logically aligned between sync code glyphs 37 that occupy logically corresponding positions in two neighboring sync code subpatterns, suitably are identified on a "best efforts basis," (1) by explicitly resynchronizing the decode process at one of the logically paired sync code glyphs 37, and (2) by then advancing the decode process, data glyph-by-data glyph, toward the second of the paired sync code glyphs 37. This process is repeated for one after another of the logical pairings of the sync code glyphs 37. It, of course, will be understood that this is a "best efforts" process because local damage can frustrate the attempt to identify some of the data glyphs 34 with the precision that is required to reliably determine their logical ordering. However, synchronization losses are easily detected. In that connection, it will be noted that the number of data glyphs 34 that are read while the decode process is searching for data glyphs 34 that are logically aligned between any two logically paired sync code glyphs 37 is a reliable indication of whether the anticipated number of data glyphs 34 was found or not. Moreover, the success or failure of the decode process in tracking from one to the other of the logically paired sync code glyphs 37 is a strong indication of whether synchronization was preserved during the reading of the intervening data glyphs 34. Thus, if synchronization errors occur, suitable remedial and/or corrective action can be taken. This action may be transparent to the user, such as when there is sufficient error correction capacity to correct the errors or may involve more drastic measures, such as notifying the user that the decode results are invalid and/or incomplete.

Figure 3:
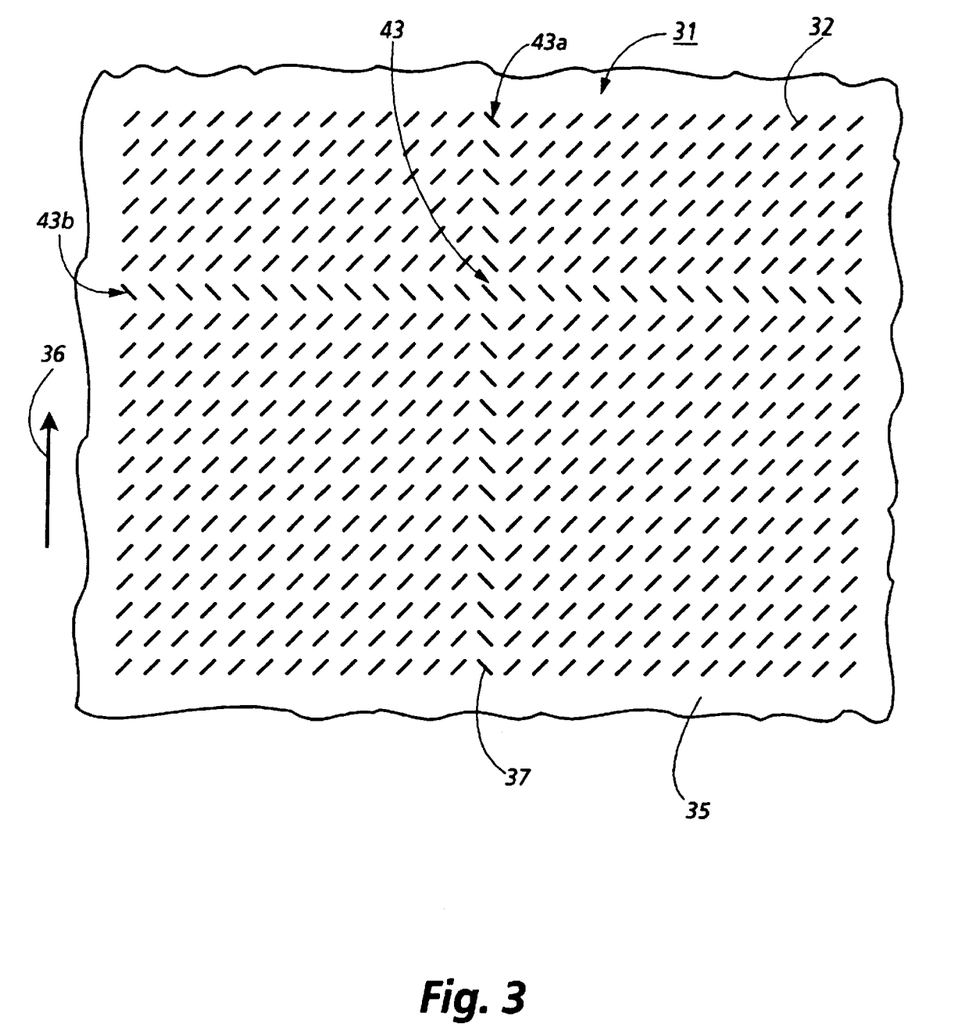
FIG. 3 is a simplified, enlarged illustration of a block formatted self-clocking glyph code that contains non-colinear synchronization code patterns in accordance with a more detailed aspect of this invention.

As shown in FIG. 3, the computational uncertainty of relying on data glyphs 34 as implicit spatial synchronization references can be avoided by employing a sync code pattern 43 that is composed of a plurality of nonparallel linear sync code subpatterns 43a–43b that jointly span the composite code pattern 31( (e.g., along its x-axis and its y-axis). Two such subpatterns 43a and 43b are sufficient for reducing the synchronization errors that may tend to occur; for example, as a result of one or two dimensional distortion of the image of the composite code pattern 31. Moreover, if the sync codes that are employed provide unique addresses over some definite span of each of the sync code subpatterns, such as is provided by the some of the digital codes that are discussed hereinbelow, a single pair of nonparallel sync lines can further reduce synchronization errors caused by dropouts of individual data glyphs 34, groups of neighboring data glyphs, and/or full lines of data glyphs.

Linearly extrapolating from the x and y coordinates of the glyphs 37 of the sync code subpatterns 43a and 43b in directions parallel to the y-axis and x-axis, respectively, of the composite code pattern 31 yields lines that intersect at prospective center locations for the data glyphs 34, thereby providing explicit spatial synchronization references for the data glyphs 34. In practice, the scanned in image of the composite code pattern 31 may be skewed somewhat, but any slight skew error may be eliminated if the angular orientations of the sync code subpatterns 43a and 43b relative to the x and y axes of the composite code pattern 31 is known. Specifically, that information can be used to compute a global or local skew correction factor that brings the sync code strings 43a and 43b into the proper angular orientation with the x and y axes of the composite code pattern 31. While any two nonparallel sync code strings that jointly span the composite code pattern 31 along its major axes will suffice, two perpendicular sync code strings 43a and 43b that span the composite code pattern 31 along its x-axis and its y-axis, respectively, are shown to provide a straightforward example.

Still further, as shown in FIGS. 4–12, two non-colinear sets of parallel linear sync code subpatterns can be used to form a lattice-like sync code pattern 53 that is composed of a two dimensional tiled array of sync code cells 54a–54ithat have rectangular or parallelogram-like configurations. The x, y coordinates on which the glyphs 37 of such a sync code pattern are centered may be identified, and the glyphs 37 may be decoded, systematically throughout the composite code pattern 31 by following the sync code lattice. Since there are four paths to most vertices of this lattice, almost any given glyph 37 of the sync code pattern 53 can be reached by following a path of logically ordered sync code glyphs (this notion of imposing a predetermined logical order on the values of neighboring glyphs in the sync code pattern 53 is discussed in more detail hereinbelow), even when damage frustrates any attempt to determine the logical ordering of the glyphs 37 along one or more of the alternative paths. For example, see FIG. 11 where the overwrites 81, 82, and 83 partially obliterate portions of the lattice-like sync code pattern 53. The closed line geometry of the overwrite 81 may prevent the sync glyphs within its interior from being reached, but it is possible to navigate around the open line overwrites 82 and 83 on sync code glyphs.

Figure 4:
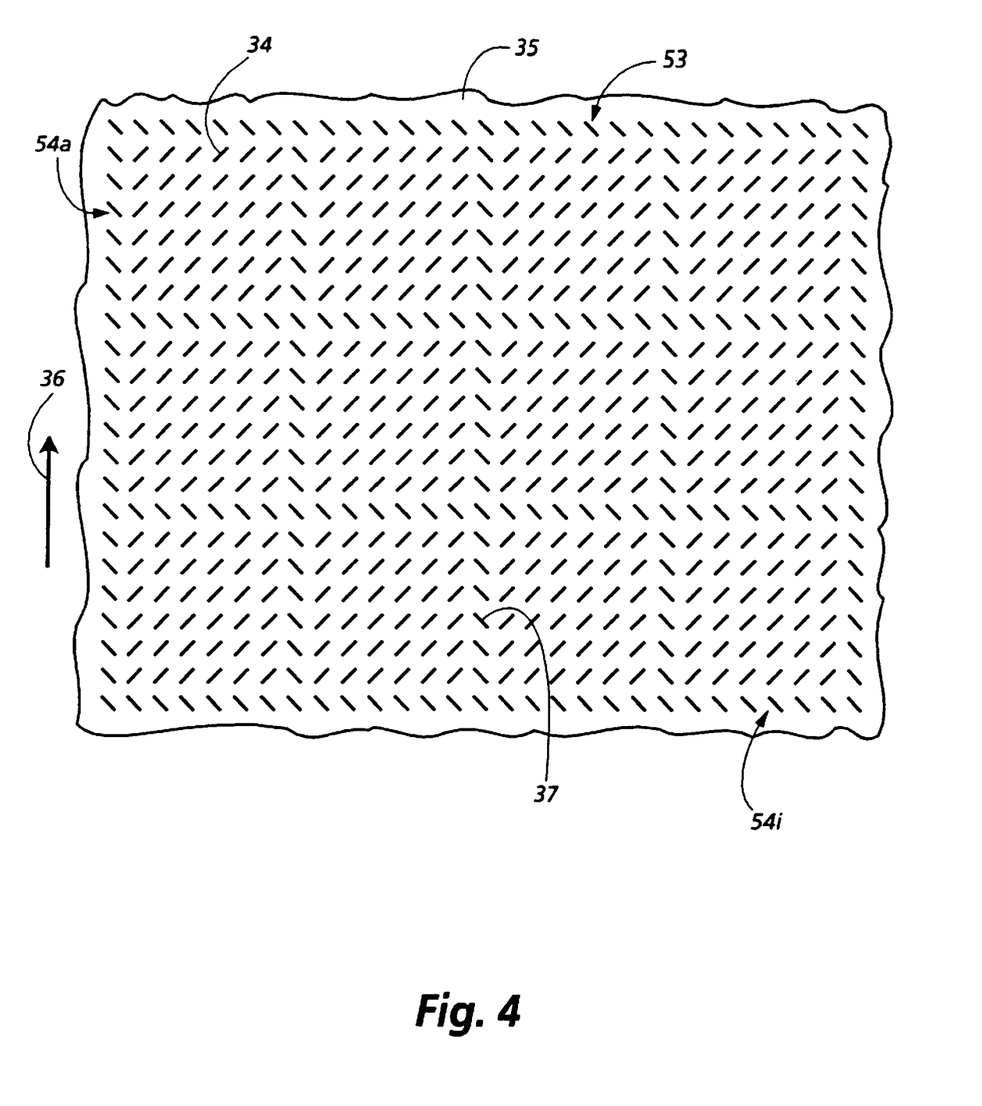
FIG. 4 is a simplified, enlarged illustration of a glyph code pattern that has a lattice-like framework of two dimensional sync code sequences in accordance with an even more detailed aspect of this invention.

As will be appreciated, the use a two dimensional sync code lattice, such as the sync code pattern 53, permits positive verification of the number of data glyphs 34 that are read in a linear array of glyphs, such as a row or column of data glyphs 34 that has both ends terminated by sync code glyphs 37. This, in turn, means that such a sync code pattern permits substantial verification that branching to an adjacent row of glyphs has not occurred during the reading of the data glyphs 34 that are fully confined by the sync code lattice. Advantageously, the dimensions of the lattice cells 54a–54i (as measured by sync code glyph count) are uniform because this permits the periodicity of the cyclical synchronization codes that are discussed below to be matched to the periodicity of the sync code pattern 53. While FIG. 4 shows that each cell 54a–54i of the sync code pattern 53 contains a 6×6 array of data glyphs 34, it will be understood that any M×N lattice may be employed in practice. For example, each of the cells 54a–54i of the lattice pattern 53 suitably frames a logical data block composed of a 16×16 array of data glyphs 34, thereby reducing the overhead cost of including the sync code pattern 53 to provide the spatial references that are required to explicitly synchronize the decoding of the data glyphs 34.

DIGITAL CODES FOR SYNC GLYPH CODES.

As is known, digital codes of various descriptions have been extensively utilized to synchronize communication signals. This usually is a one dimensional synchronization problem. The present invention, on the other hand, deals with a two dimensional synchronization problem. As will be seen, however, it has been found that very effective two dimensional synchronization code patterns can be implemented by using combinations of one dimensional digital codes. Moreover, it has been further found that some of these two dimensional sync code patterns have attractive attributes for more detailed applications, including absolute and relative logical addressing of the structure and/or information content of self-clocking glyph codes, orientational disambiguation of the information content of such codes, and enhanced tolerance to damage and/or distortion.

There clearly is a fundamental advantage to associating digital sync codes with glyph patterns that are spatially well ordered and relatively easily identified. The above-described linear glyph code patterns are good examples of patterns that satisfy these general criteria.

Indeed, as will be recalled, even parallel line sync code patterns (see FIG. 2) can provide synchronization information with respect to two dimensions: i.e., along and transverse to the lines. Furthermore, it will be evident that the positive confirmation that a sequence of glyphs on a line encode a predefined digital sync code makes the line a registration mark with respect to transverse position; e.g. the edge of a glyph subregion. Simple repetitive digital codes such as 11111111 . . . or 10101010 . . . can be used for this purpose. They clearly are simple to detect, but they provide limited addressing information along the line and minimal absolute addressing information. Moreover, the high symmetry of these repetitive codes provides little aid in resolving orientation ambiguity (this subject is discussed in more detail hereinbelow).

It also will be understood that the intersections of sync code patterns that are composed of nonparallel linear strings of sync code (FIGS. 3–_ can serve as references for synchronization, even if the digital codes themselves lack unique addressing, such as in the simple code sequences mentioned hereinabove. For example two sets of intersecting linear subpatterns of glyphs that encode sync codes, as in FIG. 4, can provide some two dimensional absolute registration capability. Specifically, the confirmation that each of these linear glyph strings encode sync code establishes linear boundaries for a glyph region or cell that is framed by sync code glyphs, and that framed region is known (because the spatial formatting rule is known) to have a predefined pattern of interior glyph positions.

Cyclic digital code sequences that conform to so-called maximal length sequences (MLS) can be generated by appropriately configured digital shift registers or by reference to a bit-level description of the desired MLS (see, Shift Register Sequences by Solomon W. Golomb, Holden-Day, Inc. 1967). It now has been found that these MLS digital sequences have properties that make them very useful for more sophisticated processing of two dimensional glyph codes.

More particularly, it is known that an n-stage shift register that produces a MLS will generate a binary sequence of length $L=2^n-1$, in which every subsequence of length n is unique. Thus any subsequence of at least length l=n, defines position along the sequence and, therefore, a local synchronization reference and a local address with a periodic ambiguity of L. Continuation of such a shift register sequence is cyclically periodic with period L. For example, if n=3, then L=7 and a corresponding MLS shift register bit sequence is S=00111010011101 . . . Thus, it will be evident that n may be easily chosen, if desired, to be large enough so that there is no repeat of the bit sequence S within a bit string of any given finite length. More generally, it will be observed that when a spatially ordered array of glyphs encode the values of one after another of the bits of a non-repeating shift register subsequence in logical order, the bit values that are encoded by the glyphs provide absolute one dimensional addressing transversely of the array of glyphs. As will be appreciated, this absolute addressing property follows from the mapping of the logically ordered, non-repeating shift register subsequence on to the spatially ordered pattern of glyphs, so it is not limited to linear patterns of sync code glyphs.

As a general rule, MLS sequences are not symmetric for n>2. Although an address defining MLS subsequence of length n may be symmetric in the forward and reverse directions (e.g., 101), extending the sequence to no more than length 2n will break the symmetry (e.g., 101001). As will be seen, this property of MLS codes can aid in glyph pattern symmetry disambiguation.

As previously pointed out, an n-stage shift register maximal length sequence has a cyclic period of bit length $L=2^n-1$, which is exactly one less than a "round" binary number. Thus, for n=1, 2, 3, 4, 5, 6, 7, . . . ; L=1, 3, 7, 15, 51, 63, 127, . . . These bit lengths do not naturally match the round binary units in which digital data is typically assembled; e.g., nibbles(4), bytes(8), blocks(512×8). This is meaningful because it implies that MLS codes have the drawback of not precisely spanning data blocks that are arrayed in convenient binary units.

Fortunately, however, it has been shown that for an n-stage shift register with a maximal length sequence of $2^n-1$ that every cycle period between 1 and 2n can be obtained from it by one of $2^n-1$ simple standard modifications to a nonlinear shift register [Golomb, op. ct. p. 192–194]. In many cases, the resulting sequence is a subsequence of a maximal-length sequence. For example:

Maximal n=4, L=15, S=111000100110101111000
Truncated L'=8, S=11100010.111000

Maximal n=5, L=31, S=0000100101100111110001101110101.

Truncated L'=17, S=00001001011001111.00001 (Note, each 5 bit subsequence is unique)

In general, these cyclic codes, including the cyclic truncated sequences, provide unique n bit subsequence addressing within each cycle (i.e., within each local region of the printed glyph code).

An n-stage shift register with a maximal length sequence of $L=2^n-1$ generally contains a subsequence of (n−1) 0's adjacent to (n)1's. Thus, such a sequence can be padded by inserting one or more (i.e., "r") additional 0's adjacent to the (n−1) 0's. Adding one 0, yields a sequence of period length ($L'=2^n$), a round binary value. Thus, padding of this type can be used in a glyph code to align each cycle of sync code with a block of data code that is written in a convenient binary format. Inserting two or more 0's enables alignment with (1) a data block having an "even" binary format, together with (2) one or more regions of additional glyphs which may be used for separate purposes, such as transverse lines of sync code glyphs. As will be seen, this zero padding has the useful property of preserving the uniqueness of all n-bit subsequences, except for the string of 0's that is immediately followed by and unambiguously identified by the (n)1's, as unambiguous addresses along the code.

Examples:

n=2, r=0, L=3, S=011011 (Cautions: symmetric)

n=2, r=1, L'=4, S=00110011 (Cautions: bit inversion= reverse of sequence; symmetric)

n=2, r=2, L'=5, S=0001100011.

n=3, r=0, L'=7, S=00111010011101 n=3, r=1, L'=8, S=0001110100011101 [Caution: bit inversion=sequence reverse]

n=3, r=2, L'=9, S=000011101000011101.

n=4, r=0, L'=15, S=000111101011001000111101011001 n=4, r=1, L'=16, S=0000111101011001000011110101100 n=4, r=2, L'=17, S=000001111010110010000111101011001

It also has been recognized that a periodic sync code that provides unique addressing within a subsequence of predetermined length (such as an MLS code) can be employed to provide directional steering to the glyph location for an intersecting transverse pattern of sync glyphs. Thus, when a periodic sync code of the foregoing type is employed, it is useful to match the spacing of transverse lines of sync glyphs to the period of the periodic sync code so that there is consistent transverse referencing between the periodic sync code and the transverse sync glyphs.

Figure 5:
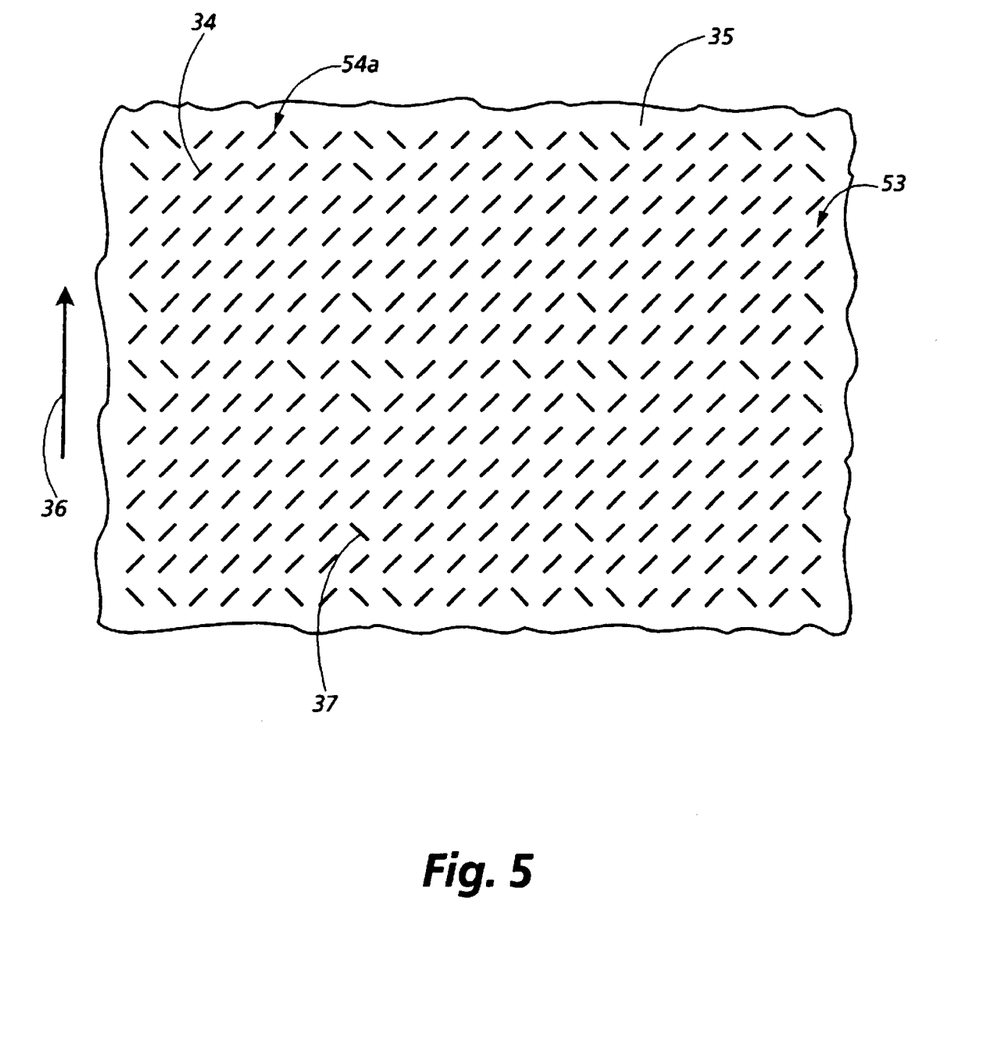
FIG. 5 is a simplified, enlarged illustration of a glyph code pattern that has a lattice-like framework of interlocking, two dimensional sync codes.
Figure 6:
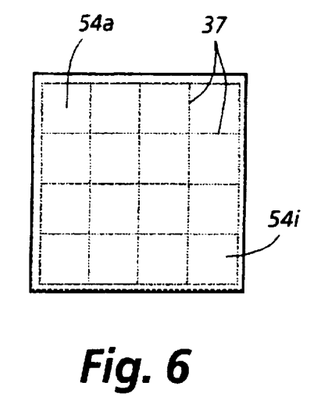
FIGS. 6 and 7 are full size illustrations of the sync code and data code components, respectively, of a glyph code pattern of the type shown in FIGS. 4 and 5.
Figure 7:
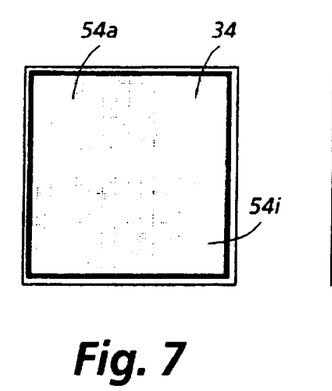
Figure 8:
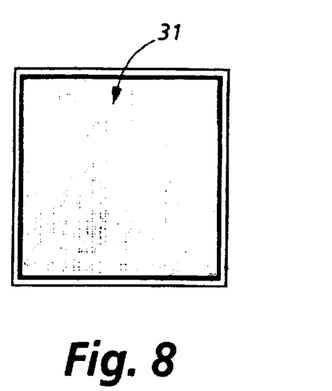
FIG. 8 is a full size illustration of a composite glyph code pattern that is composed of the sync code and data code components that are shown in FIGS. 6 and 7, respectively.

The maintenance of consistent transverse references between intersecting strings of sync code is, of course, extensible to some of the more interesting glyph code patterns, including the lattice-like glyph code patterns shown in FIGS. 4–8. More particularly, it will be evident that two intersecting sets of parallel glyph code subpatterns that encode periodic sync codes may be spaced at periodic intervals fitting both sync codes. Moreover, it can be shown that a spacing that matches the periodic intervals of both codes yields an interlocking periodic grid of sync with the same bit patterns in the neighborhood of each intersection. Indeed, this is illustrated in FIG. 5 for the code 0011101 in a square lattice. And, it also applies to FIGS. 6–8 where the sync code pattern is a square lattice of glyph strings that encode the 17 bit cycle code with two zero bit padding discussed above. FIGS. 6 and 7 show the sync lattice and the data glyphs printed separately, while FIG. 8 illustrates the combined or composite glyph code which shows that the sync code visually blends uniformly with the variable data encoded glyphs.

On a somewhat more general level, if intersecting strings glyphs encode linear address information and share common glyphs, the values encoded in the shared glyphs preferably are consistent with both of the encoded sequences. On the other hand where the sync codes do not otherwise provide appreciable unique addressing, as in simple codes(111 or 1010), it may be advantageous to arrange the intersection glyphs to be discordant with one or both of the sync sequences to facilitate the identification of the intersection location; e.g., 1111101111111, or 101010001010.

Figure 9:
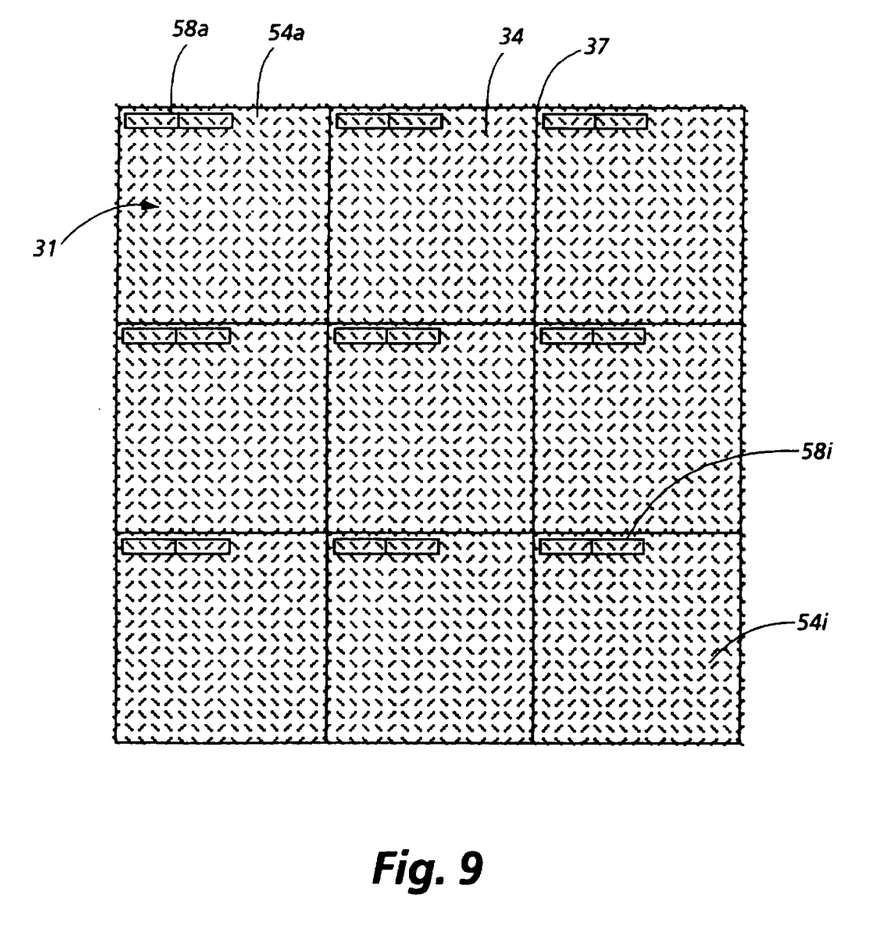
FIG. 9 is a simplified, enlarged illustration of a multiple logical data block formatted glyph code pattern that has a lattice-like framework of two dimensional sync codes and internal block labels for extended addressability.
Figure 10:
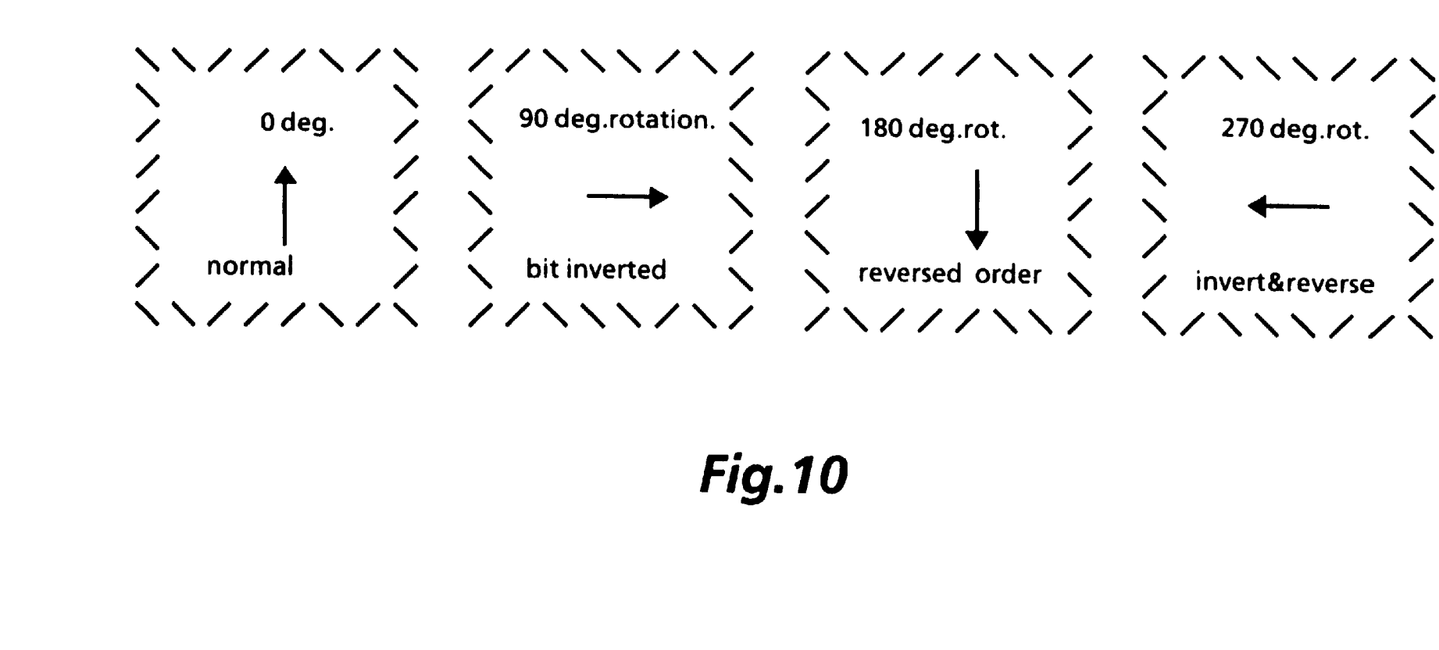
FIG. 10 diagrammatically illustrates the use of asymmetric sync code sequences for symmetry disambiguation.

As shown in FIG. 9, the translational ambiguity of a repeating periodic sync sequence can be overcome by writing additional predefined data in "reserved" glyphs 58a–58i which have a known order and which reside at predefined positions with respect to the encoded sync code glyphs. For robustness, the glyphs that are reserved for encoding this additional information preferably are spatially adjacent to the sync code glyphs 37. The additional information that might be encoded in these reserved glyphs includes physical and/or logical data block identification. For example, the cyclic sync codes that are contemplated by this invention can be supplemented by encoding appropriate data block specific information in these reserved glyphs 58a–58i to enable the sync code to be used for synchronizing the of data glyphs, on a data block basis and the reserved glyphs 58a–58i to be employed for identifying the data blocks physically with respect to the overall glyph code pattern. To this end, in FIG. 9 there are nine data blocks 54a–54i which are surrounded by a cyclic MLS code [n=4, L'=16 (padded with a single zero)] and labeled with a byte of data in the upper left corner giving block coordinates in the form of two hex code numbers; e.g. 00100011 corresponds to 23, which is a suitable identifier for the data block in the second column and third row of the tiled format.

Physical addressing of the data blocks 54a–54i provides a powerful indexing mechanism for random access to the data recorded in any of the data blocks 54a–54i. Furthermore, if desired, this indexing may be extended hierarchically to include, for example, a page index value, a volume index value and similar logical correlators in the data that is written into the reserved glyphs 58a–58i. Standard random access techniques can then be employed for advancing the glyph reading process from one data block to another data block within the same glyph code pattern or a different glyph code pattern. As will be appreciated, the ability to index reliably and efficiently from one glyph code pattern to another is dependent on having a substantially stable and/or easily reconstructable relationship between those patterns, so that the indexing can be performed using straight forward mathematical functions (i.e., addition and subtraction). Image distortions and other factors may perturb the physical relationship among well-linked glyph code patterns slightly, so it sometimes may be best to perform random access seeks using a convergence strategy; whereby each seek starts with a coarse indexing to at least roughly approach the target location, and then continues with one or more progressively finer seeks until the target is located precisely. As will be appreciated, the indexing data in the reserved glyphs 58a–58i can be used to control the coarse seeks, while the finer seeks can be controlled using the precision provided by the above-described addressing codes.

Considering the issues involved in disambiguating the sync code glyphs 37 from the data glyphs 34 in some additional detail, the general rule is that the ability to distinguish a predefined ordered subset of k glyphs that encode sync code from glyphs that encode variable data with a random occurrence of bits is governed by the probability of random match of all bits, $\frac{1}{2}^k$, which decreases exponentially (geometrically) with k. Even for nonrandom data, matching to a pseudorandom synchronization digital code, such as the maximal length sequences, will be similarly improbable. Thus, the first key test for disambiguating sync glyphs from data glyphs focuses on determining whether a given spatially ordered sequence of glyphs encodes values of the known sync code in valid logical order.

As will be appreciated, the linear sync glyph patterns that are proposed hereinabove facilitate this logically ordered sorting of glyphs, but there still is an uncertainty of translation by an integer number of glyphs, together with a possible gross rotational ambiguity as more fully described hereinbelow. Therefore, when a cyclic sync code having a period of L bits is employed, the testing to identify the glyphs that are encoded with this sync code suitably begins with a search for glyphs that encode a logically ordered subsequence of k bits that matches on the known sync code, where k is long enough to uniquely define synchronized address within a single period of the sync code. Then the probability of this subsequence randomly matching a translation phase of the sync code is $L/2^k$ of course, if k+L is equal to or greater than m, where m is the total number of sync glyphs in a full line of sync code, then the number of valid sequences is reduced from L to (m−k), yielding a random match probability, of $(m-k)/2^k$.

Once a tentatively valid sync code subsequence is found, a follow-on test typically is performed to confirm that the particular subsequence continues to match on the known sync code as it is being extended by the decode values for one after another of the glyphs that logically extend the subsequence in accordance with the spatial formatting rules. In other words, the apparent sync code pattern is further delineated and verified by confirming that the decode values it yields for subsequences of increasing k continue to match on the known sync code. Generally, adequate sync distinguishment is achieved when the probability of mistakenly identifying data as sync is deemed to be acceptable. For most applications, this condition can be satisfied while using a moderately sized k for sync verification because of the fast growth of the exponential probability dependence on k.

Figure 11:
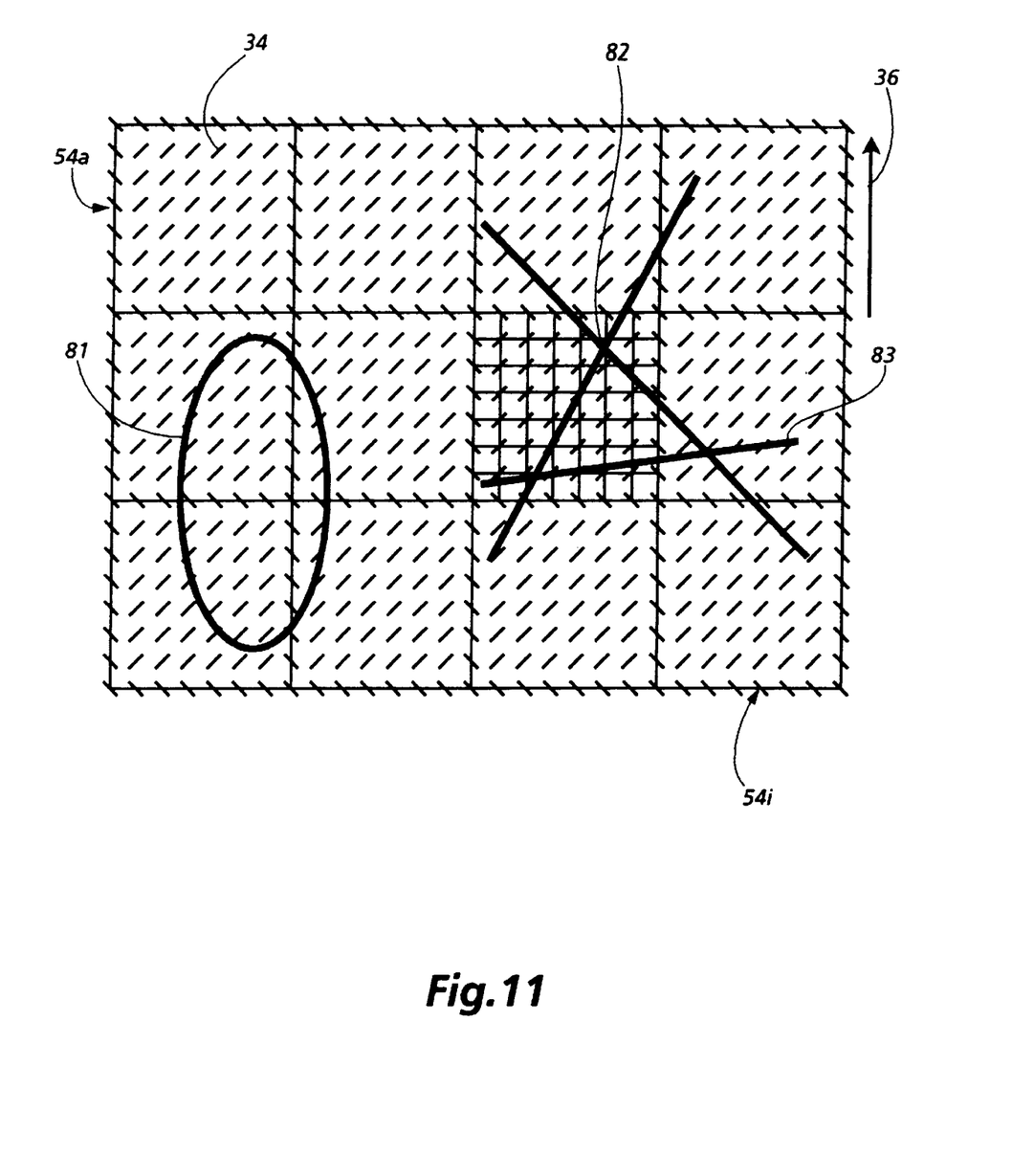
FIG. 11 illustrates the use of a lattice-like sync code pattern for navigating around damage in glyph code patterns.
Figure 12:
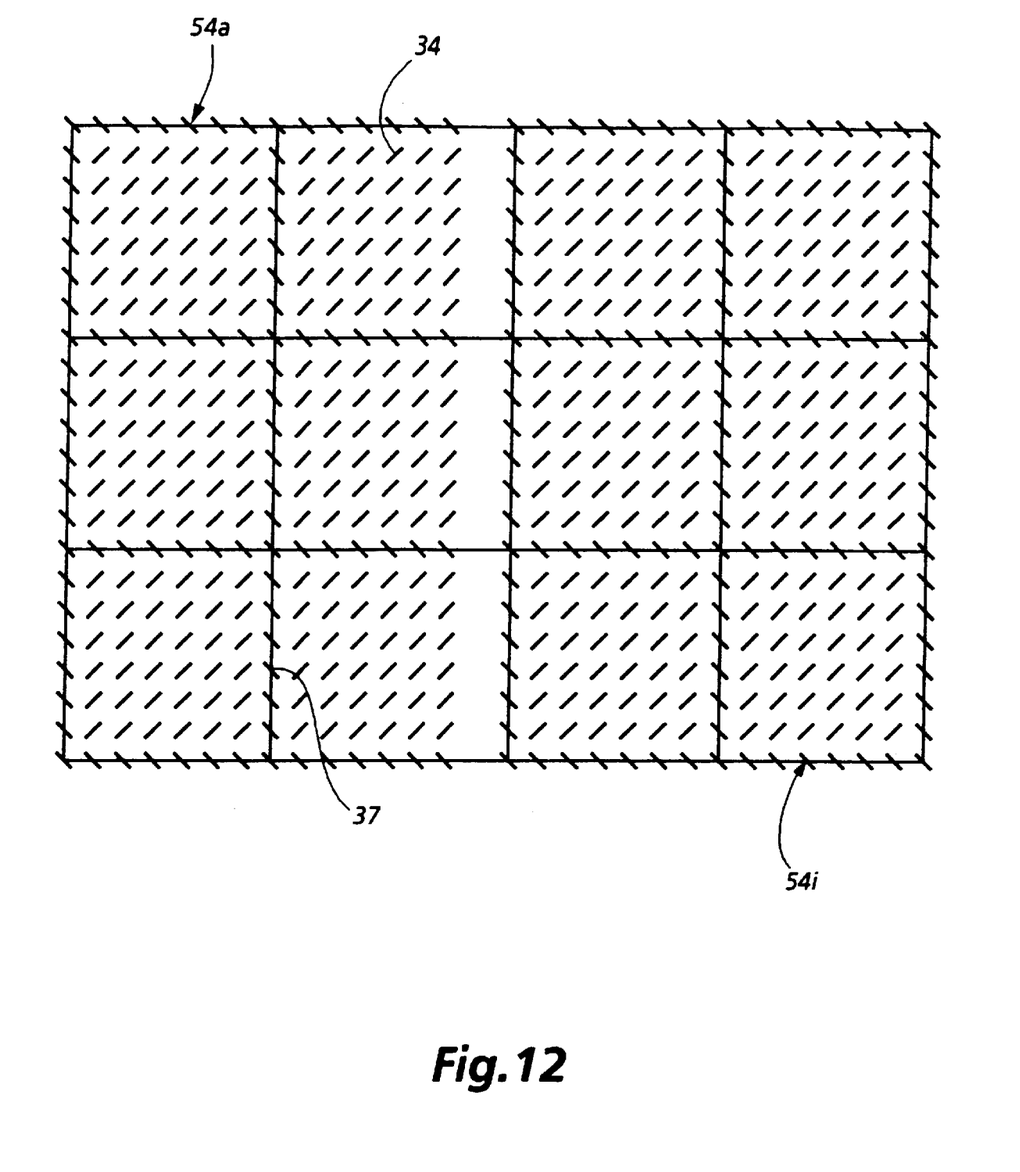
FIG. 12 illustrates the use of a lattice-like sync code pattern for explicitly synchronizing a distorted glyph code pattern.

Verification of known cyclic sync patterns is further facilitated by the bidirectional (i.e., forward and backward), bit-by-bit verifiability of the logical extensions of such patterns. Furthermore, the use of two dimensional lattices of sync glyphs that encode interlocking cyclic sync codes, as described hereinabove, facilitates robust distinguishment of the sync pattern by providing connectivity among linear strings of sync glyph. As shown in FIGS. 11 and 12, the additional sync verification tools that are provided by the bidirectional and interlocking logical attributes of this class of sync code are especially valuable for reestablishing explicit spatial synchronization for the decoding of glyph code when the sync code pattern is disrupted (i.e., logically broken erroneously) by local damage and/or degradation of the glyph code.

As will be understood, absolute verification of synchronization may also be achieved on finite area bounded glyph code patterns, such as shown in FIG. 3, by predefining and detecting a geometrically unique subpattern of sync code glyphs for which there is no congruent pattern of glyph centers. In the absence of glyph "dropouts", such a sync code pattern can be verified in the image domain, without having to perform any pattern matching at the bit level (i.e., in the digital domain). For example, if the glyph code is written on a rectangular array of glyph centers, a sync code pattern that is written into a predetermined column and row of glyphs to span the array completely (i.e., including the border glyphs, as in FIG. 3) is geometrically identifiable as sync code. Such a geometrically identifiable sync code pattern also provides a degree of absolute 2D addressing, referenced by counting glyphs off this sync pattern, rather than by reference to a boundary feature.

It has been found that sync code encoded glyph patterns also can be used to identify and correct ambiguities in glyph codes due to symmetries that exist in the pattern of glyph centers with respect to operations such as image rotations (e.g., 90°, 180°, 270°) and/or image reflections. When these orientational ambiguities transform individual glyphs into permissible members of the glyph code, disambiguation is not trivial.

For example, slash-like glyphs that are tilted to the left or right at 45° (i.e., +45° and −45°, respectively) to encode bit values of "0" or "1," respectively, might be written in accordance with a spatial formatting rule that maps their centers into a square lattice array. As previously pointed out such a glyph pattern has a four-fold rotational ambiguity. Specifically, a 180° rotation of the glyph code pattern maintains the identities of the individual glyphs because each of the glyphs is transformed into the same, orientationally matched member of the glyph set. In other words, the values encoded in the individual glyphs are preserved. However, this 180° rotation inverts the apparent ordering of linearly aligned glyphs. Fortunately, there is a straightforward solution to this problem because the glyphs still are linearly aligned, and the direction in which they are aligned is unchanged. In particular, if the glyph code pattern includes a linear pattern of sync glyphs, as at 61 in FIG. 10, that is encoded in accordance with an asymmetrical sync code sequence (e.g., a maximal length shift register sequence), testing for the sync code sequence and its reverse resolves the ambiguity. On the other hand, 90° or 270° rotations transform each of the two permitted glyphs into the other, thereby interchanging their apparent encoded values. Furthermore, the apparent directions of orthogonal lines (e.g., rows and columns, or 45° diagonals) also are interchanged. And to further complicate the problem, the apparent ordering of a linear pattern of sync code encoded glyphs may be normal (in the event of a 90° rotation) or reversed (in the event of a 270° rotation) with respect to the sync code sequence. Thus, to resolve this ambiguity through the use of a n-stage shift register maximal length sequence sync code, a test sequence of at least 2n is employed to avoid inadvertent match to a subsequence that is reversed and/or bit-inverted. Hence, it will be understood that four tests for the sync sequence, deciding bit inversion and sequence reversal, will resolve the ambiguity for four rotation states. [0°, 90°, 180°, 270°].

Mirror symmetry, which might occur in connection with the use of transparencies, is an additional ambiguity that might be encountered, so additional encoding precautions may be taken to assure disambiguation. For example, to resolve the combination of possible ambiguities, row and column sync codes suitably are selected to be distinct or to at least provide a different phase shift along the code as referenced from sync line intersections.

An alternate approach to disambiguation would be to use an asymmetric spatial patterns for the sync code. This requires disambiguation search in image space of glyphs rather than digital space of codes.

For some applications, sync code encoded glyph patterns may be used in combination with coarser synchronization information, such as image reference marks or features, to support a dual phase, coarse/fine synchronization process)

In decoding glyph arrays containing glyphs encoding a predefined sync code and variable data glyphs, the predefined sync code glyphs generally are decoded first. For example, in the case of a lattice-like sync code pattern, the decoding can be initiated at any desired location. To locate nearby sync code encode glyphs possible sync subsequences of glyphs are tested in a local region that is large enough to definitely include a section of sync pattern. If there is concern for orientation ambiguity, these possible sync subsequences are evaluated for each of the possible orientations until a satisfactory result is found. When an initial section of the known sync pattern is found, the sync pattern then is extended glyph-by-glyph. If the glyph code sequence is blocked by damage, alternate sync pattern paths may be followed. When required jumps to adjacent regions may be logically connected via digital sync code addressing properties. After the sync glyphs have been located as completely as possible, variable data may read with logical order referenced and confirmed by local sync glyph code. Optionally the lattice of sync glyph locations may be used to interpolate the expected image positions of variable data glyphs.

Alternatively, the sync code may be used only after the data code has been transformed into a two dimensional array of decode values. In this event, the sync code is used in a feed forward mode to reorder and correct the decode values as may be required to compensate for decode errors, such as additions, dropouts and shearing of data.

What is claimed:

1. An optically readable record for storing encoded digital information; said record comprising a recording medium;

a self-clocking data code pattern for encoding said information; said data code pattern being composed of glyphs that are written in a two dimensional code field on said recording medium on centers that are spatially distributed in nominal accordance with a predetermined spatial formatting rule; said glyphs being defined by respective symbols that are selected from a finite set of optically discriminable symbols to encode said digital information; and at least one additional code pattern that is written on linearly aligned centers on said recording medium in nominal accordance with said spatial formatting rule, said additional code pattern being composed of glyphs which are selected from said finite set of symbols in accordance with a predetermined, asymmetric digital code sequence, whereby said asymmetric code sequence disambiguates between data codes that are rotated 0° and 180°, even though said data code pattern and said additional code pattern are composed of glyphs that provide a substantially uniform visual appearance.

2. The record of claim 1 wherein said additional code pattern is further selected to also disambiguate data codes that are rotated 90° and 270°.

3. The record of claim 2 wherein said additional code pattern os further selected to also disambiguate mirror image transformed data code patterns.

4. The record of any of claims 1–3 wherein said glyphs are composed of elongated slash-like symbols that oriented at different angles to encode different digital values.

5. The record of claim 4 wherein said glyphs are oriented at +45° and −45° with respect to a vertical axis of said recording medium for encoding different binary values.

\* \* \* \* \*